Figure 1:
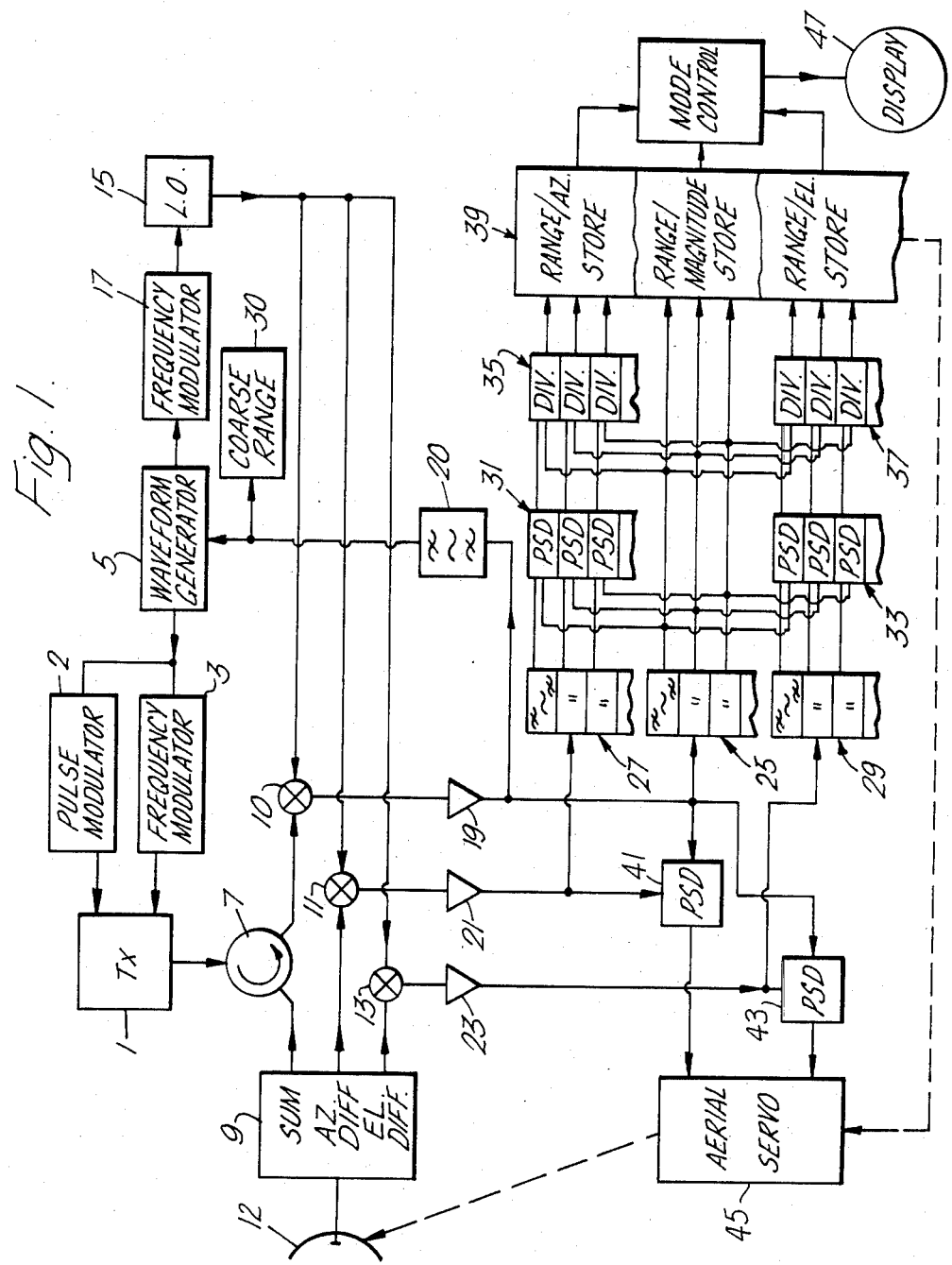

United States Patent [19]

Welsh

[11] Patent Number: 4,688,043
[45] Date of Patent: Aug. 18, 1987

[54] HIGH RESOLUTION RADAR SYSTEM
[75] Inventor: John Welsh, Hertfordshire, England
[73] Assignee: Marconi Avionics Limited, England
[21] Appl. No.: 374,708
[22] Filed: Apr. 28, 1982
[30] Foreign Application Priority Data
Apr. 29, 1981 [GB] United Kingdom ............... 8113166
[51] Int. Cl.⁴ .............................................. G01S 13/44
[52] U.S. Cl. ..................................... 342/149; 342/201
[58] Field of Search ................... 343/16 M, 17.2 PC; 342/132, 149, 201

[56] References Cited
U.S. PATENT DOCUMENTS

| | | | |
|---|---|---|---|
| 3,303,497 | 2/1967 | Chubb | 342/95 X |
| 3,354,456 | 11/1967 | Caputi, Jr. | 343/17.2 PC |
| 3,720,950 | 3/1973 | Vehrs, Jr. | 342/162 |
| 3,795,913 | 3/1974 | Kosowsky et al. | 343/16 M |
| 3,878,525 | 4/1975 | Alpers | 342/132 X |
| 4,307,399 | 12/1981 | Love et al. | 342/132 X |
| 4,346,382 | 8/1982 | Bosc et al. | 342/192 |

Primary Examiner—T. H. Tubbesing
Attorney, Agent, or Firm—Kirschstein, Kirschstein, Ottinger & Israel

[57] ABSTRACT

A radar system for tracking airborne targets, in which the transmitted pulse signal is swept over a predetermined frequency range (3). A local oscillator (15) in the receiver is swept over a similar frequency range the L.O. sweep modulation being initiated (20) by the first significant target return signal. Reflectors on the target at different ranges therefore produce different I.F.s in the receiver. Discrimination between the various target reflector features is thus achieved by filtering (25, 27, 29) the I.F. signals in a series of small bands, each band corresponding to a particular target-feature range. Azimuth, elevation and magnitude of a target feature can thus be obtained for each range cell.

7 Claims, 2 Drawing Figures

HIGH RESOLUTION RADAR SYSTEM

The present invention relates to radar systems and particularly, but not exclusively, to airborne radar systems for tracking aircraft targets.

A major problem in tracking a high speed target is the presence of 'glint', which, broadly speaking, is a phenomenon arising from interference between reflections from multiple 'scattering points' on a target.

When a plane or nearly plane wave illuminates two or more scattering points the scattered energy sets up a wave interference pattern (or composite scattering pattern) in the surrounding space with characteristic maxima and minima. The greater the spatial extent of the scatterers, the finer the structure of the composite scattering pattern and the greater the total number of lobes in it. The phase and direction of the phase fronts within the composite scattering pattern, though readily calculable in a model situation, vary over the full range of possible values. For example in the simple case of equal scatterers spaced 'n' whole wavelengths apart, the composite scattering pattern is a daisy-petal pattern comprising 4n equal maxima with exact nulls between them. The phase alternates between adjacent maxima and the phase front varies from circumferential at the maxima to radial at the nulls.

A direction sensitive radar system, by its nature senses the direction of the wave phase front in its effective aperture and will thus give a wildly varying indication of the target position as the latter moves and its scattering pattern maxima and minima traverse the antenna. Fortunately, in practice this difficulty is alleviated to some extent in that the "correct" phase front directions are associated with strong signals and the wildly wrong directions are associated with weak signals.

This latter feature, together with the fact that most real aircraft targets comprise rather more than two scatterers enables any one of a number of useful signal processing algorithms to be employed which "weight" the usefulness of the directional information according to the strength of the signal. By using such algorithms the predicted target position can be made to be, for most of the time, somewhere within the physical envelope of the real target. The apparent position of the target, as seen by the radar, does however wander about within and around the target envelope at a rate which makes prediction of the target's future position (as required for accurate gunnery purposes) difficult and inaccurate. It has been shown that even with the use of frequency agility and optimum signal processing the glint effects still introduce appreciable errors for gunnery purposes.

An object of the present invention is therefore to provide a system which will avoid the difficulties inherent in 'glint', and provide information regarding the target structure.

According to the present invention, a high resolution radar system comrpises a radar transmitter adapted to transmit a pulsed microwave signal in which each pulse is frequency-modulated, and also comprises a radar receiver including a local oscillator, means for frequency modulating the local oscillator in the same manner as the transmitted pulse, means for mixing target returns from scatter points on a target with the local oscillator signal so that each scatter point produces a single-frequency (I.F.) signal of frequency unique to the range of the particular scatter point, and means for displaying a collective representation of the various intermediate frequencies whereby to provide target structure information.

The transmitted signal may comprise a sequence of discrete pulses, each pulse having a duration at least comparable to the delay between returns from the nearest and farthest scatter points on a predetermined target.

The means for modulating the local oscillator frequency may be operative for periods at least equal to the sum of the delay between returns from the nearest and farthest scatter points on a predetermined target and the duration of the transmitted pulse.

The means for modulating the local oscillator frequency may be triggered by reception of radar returns from the nearest scatter point on a target. This may be achieved by a signal derived from "course range" information obtained from previous frequency swept or non swept pulses, or from the edge of a "range window" manually positioned in range by the pilot.

The system preferably includes a monopulse target detection system to determine the azimuth and elevation positions off boresight of each of said scatter points and thus to provide a representation of the target scatter points employing two of the parameters, azimuth and elevation.

Figure 2:
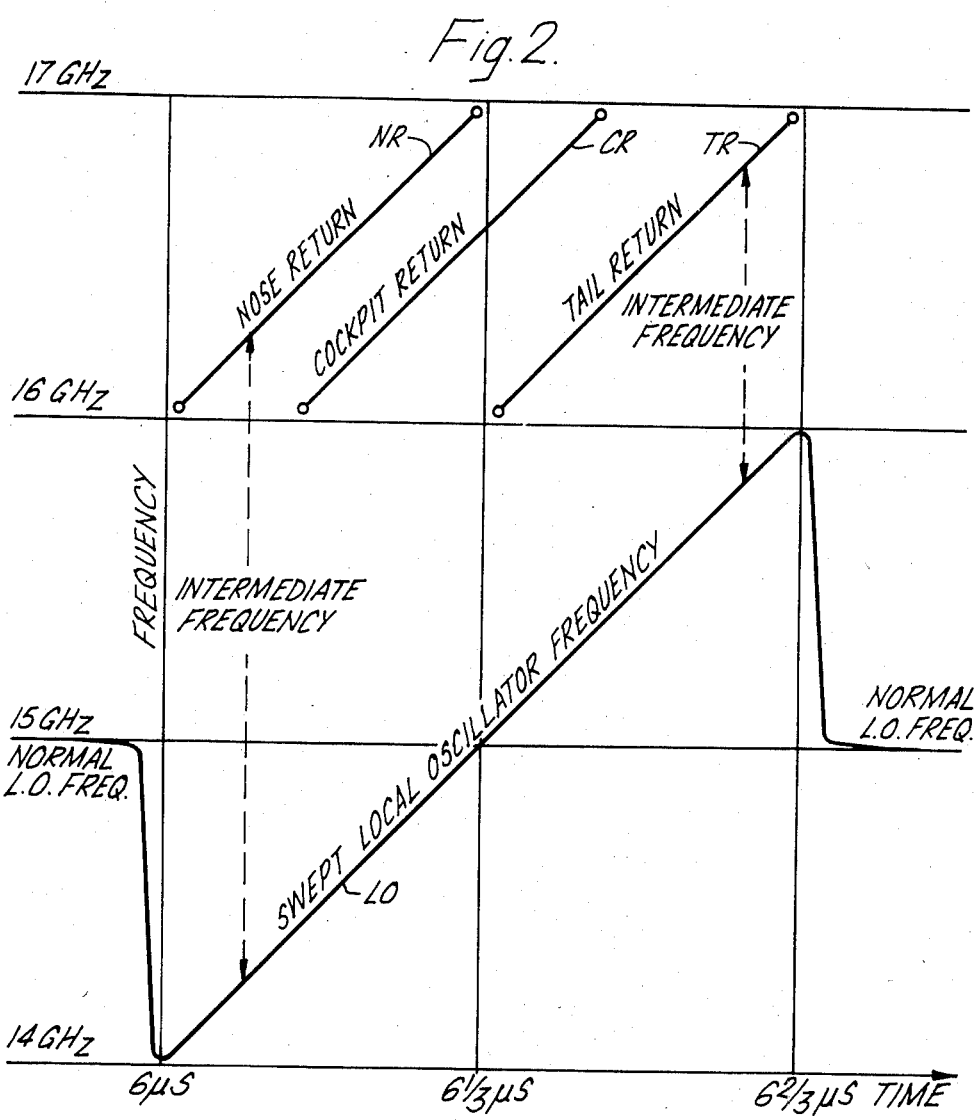

A high resolution radar system in accordance with the invention, will now be described, by way of example, with reference to the accompanying drawings, of which:

FIG. 1 is a simplified block diagram of the system, and FIG. 2 is a frequency/time diagram illustrating the derivation of scatter point frequencies indicative of range.

It has been realized that resolution of the scatter points of a target aircraft can be achieved by the use of very short transmitted signal pulses such that the 'returns' from a particular scatter point have ceased before those in the next range cell, of predetermined acceptable extent, are received by the receiver. The pulse duration, for this purpose, has to be not greater than twice the time corresponding to the extent of the range cell. For a range cell of 15 centimeters for example, the pulse duration must not exceed 1 nanosecond.

The probability of two scatter points within the same 15 centimeter range cell is small and can be ignored. Scatter points in different range cells are effectively isolated in time so that wave interference between their returns can no longer occur. Consequently, the actual direction of each scatter point can be determined rather than the resultant direction of several scatter points.

In practice the above system is very difficult to put into effect since it is impractical to transmit very short pulses at high powers. This difficulty is overcome by the present invention in which a range dependent intermediate frequency (I.F.) is derived from a frequency-modulated transmitted signal.

Referring to FIG. 1, a transmitter 1 is caused to emit pulses of a radar frequency signal, by a pulse modulator 2, the pulses having a relatively great duration of one-third microsecond. Basically, such a pulse length would produce a range cell of 50 meters, within which scatter points would be indistinguishable. Such a distance, it will be appreciated, would easily encompass a typical target aircraft so that only a single composite reflector could be discerned, with all the problems of glint, previously referred to.

However, the transmitted pulses are modulated by a frequency modulator 3 supplied with a modulating ramp signal from a waveform generator 5 to produce transmitted pulses having a frequency varying linearly from 16 to 17 GHz over the pulse length of one-third microsecond. These modulated pulses are supplied to a circulator 7 and then to the sum channel of a comparator 9 for transmission by an antenna 12.

The elements of the antenna are arranged to provide a monopulse static-split beam pattern for determination of the target direction in azimuth and elevation, in known manner. The four received signals are processed by the comparator 9 to produce a sum signal, an azimuth difference signal indicating azimuth position off boresight and a similar elevation difference signal indicating elevation position off boresight.

A target 'return' from a particular scatter point consists of a pulse of appropriate magnitude in each of the three channels. The three signals are applied to mixers 10, 11 and 13, each of which also has applied to it a local oscillator signal, which is derived from a local oscillator 15 controlled by a frequency modulator 17. The modulating signal is derived from the same waveform generator 5 used for the transmitter modulation. The local oscillator 15 operates at a basic frequency of 15 GHz. The modulator 17 is normally inoperative until a target is acquired.

Because of the short duration of the pulse signal relative to typical target return times, the ramp signal applied to the modulator 17 has to be delayed relative to the modulator 3 in accordance with a coarse range indication derived by circuit 30. Alternatively the waveform generator 5 can be duplicated and the operation of the two generators staggered in accordance with the coarse range indication.

The IF outputs of the Sum, Azimuth and Elevation mixers are amplified to a convenient level for further processing by IF amplifiers 19, 21 and 23 in known manner. Each IF signal is then applied to an identical bank of filters 25, 27 and 29, each separate filter in any one bank having a bandwidth contiguous with its neighbors to provide high resolution range information in each channel as will be further explained.

The sum IF output of the amplifier 19 has four functions, first, to provide the above coarse range indication 30 in conjunction with a 'transmit' time indication, secondly, via the filter bank 25, to provide 'reference' signals for two series of phase-sensitive-detectors (PSD's) 31 and 33, thirdly to provide denominator signals to the divider circuits 35 and 37 and fourthly to provide scatter point magnitude signals to the target fine structure store 39.

The azimuth and elevation signals from the phase sensitive detectors 31 and 33 provide 'numerator' signals for the divider circuits 35 and 37.

'Whole target' or 'coarse range' Azimuth and Elevation difference signals from the respective IF amplifiers 21 and 23 feed 'whole target' PSD's 41 and 43 to which the 'whole target' sum signal from IF amplifier 19 supplies the reference. The outputs of these PSD's, containing 'whole target' Azimuth and Elevation error signals drive the Aerial Servo system 45 to align the boresight with the target in known manner. An alternative option is to drive the aerial servo system from signals relating to one or more scatter points from the target fine structure store 39.

Referring now to FIG. 2, this shows the derivation of constant IF signals from target returns in the above described arrangement. In the particular example, the first returns, from the (oncoming) nose of the target aircraft, are received 6 $\mu$S after transmission, indicating a coarse target range of about 900 meters. The 'nose' return NR persists for the duration of the transmitted pulse, i.e. one-third $\mu$S, increasing uniformly in frequency from 16 GHz to 17 GHz. Similar returns from the cockpit(CR) and the tail (TR) arise at intervals over the one-third $\mu$S corresponding to the target length of 50 meters. Many other returns will also arise, of similar form, but are not shown, in the interests of clarity.

It so happens that the pulse length one-third $\mu$S corresponds, in this example, to the length of the target. The tail return persists for one-third $\mu$S and will therefore give a total 'returns' duration of two-thirds $\mu$S.

In general the duration of the returns will be a period corresponding to the range cell of the target plus the pulse duration itself.

The normal frequency of the local oscillator 15 is 15 GHz. At a time after the transmission of the transmitter pulse, corresponding to the reception of the first target returns, a coarse range signal is derived from the output of sum amplifier 19 and filter 20 to provide the coarse range indication 30 and at the same time trigger the waveform generator 5. The sawtooth waveform controls the frequency modulator 17 and the local oscillator frequency (LO) is swept from 14 GHz to 16 GHz. The modulation rate is clearly the same as that of the various target returns so that the IF output of the mixers 10, 11 and 13 and amplifiers 19, 21 and 23 is at a constant frequency for each return from a particular scatter point. The value of this constant IF lies between 2 GHz and 1 GHz depending upon the range of the particular scatter point with respect to the nearest scatter point. As illustrated in FIG. 2, the nose return IF is 2 GHz, the tail return IF 1 GHz and intermediate points vary proportionately.

Scatter points can therefore be distinguished by the value of the intermediate frequency. Each scatter point IF will have a bandwidth of about 3 MHz, being the reciprocal of the transmitted pulse length of one-third $\mu$S, and will be repeated at the pulse repetition rate, e.g. 100 kHz, in known manner.

Referring back to FIG. 1, it has been mentioned that the IF outputs of the amplifiers 19, 21 and 23 provide a coarse range indication and also provide error signals for antenna servo control The fourth function is to provide high resolution range information. A simplified system for achieving this is illustrated diagrammatically. Each IF output will contain, for each transmitted pulse, a large number of components of various frequencies in the range 1 GHz to 2 GHz corresponding to the various scatter points. Each component will have a bandwidth of approximately 3 MHz.

For each IF output the 1 GHz range is accommodated by a series of 330 3 MHz bandpass filters referenced 25 for the sum IF, 27 for azimuth difference IF and 29 for the elevation difference IF. An output from a particular filter element, i.e. of a particular frequency, is a direct indication of a scatter point at a corresponding range.

Each 3 MHz filter element in the series covers a fraction 3 MHz/1 GHz of the coarse range cell 50 meters, i.e., 15 centimeters.

The sum component signal from the filters 25 is applied to a series of phase-sensitive-detectors 31 and 33 to which are applied respectively the azimuth difference component and the elevation difference component. The outputs of the two sets of phase-sensitive-detectors contain azimuth and elevation information of the position off-boreseight of the particular scatter point. Such off-boresight information is however weighted by the magnitude of the return signal and to obtain a correct indication of the off-boresight position of each particular scatter point the azimuth and elevation signals are divided by the magnitude of the sum signal in a series of divider circuits 35 and 37.

For each scatter point, four quantities, range, azimuth, elevation and magnitude are stored in a buffer store 39. The store 39 comprises three sections, containing azimuth information, derived from the dividers 35, elevation information derived from the dividers 37, and magnitude information derived from the sum signal via filter 25. Each section of the store 39 consists of a series of subsections corresponding to the range cell divisions of the filters 25, 27, 29, PSD's 31 and 33, and dividers 35 & 37. Thus the four quantities, azimuth, elevation, sample magnitude, and range information are stored. Each transmitted pulse produces a complete set of sample values, i.e. azimuth, elevation and range information in each range cell. By accumulating successive samples in the store 39, integrated values are obained for periodic read-out display at the required update rate. With a pulse repetition rate of 100 kHz and a required update rate of 100 per second, a thousand successive samples can be integrated by accumulation in the store, before application to the display 47.

Various display modes can be employed: thus the azimuth and elevation signals can be applied to the X and Y plates after suitable scaling and the magnitude signal used to control the brightness or intensity of the display. The resultant display would be a "dot" picture of that aspect of that target which was presented to the radar. It would not necessarily be a plan or an elevation view of the target, unless the target happened to be in one of those attitudes. It would be a "radar eye view" of the target.

In addition, two other pictures are available:
(a) azimuth plotted against range (elevation ignored) giving a pseudo plan view.
(b) elevation plotted against range (azimuth ignored) giving a pseudo profile view.

While the range resolution as given above is 15 centimeters, it is not necessary to resolve the azimuth and elevation coordinates to the same extent and a corresponding figure of 1 meter is probably sufficient. This helps to reduce the number of storage cells necessary.

It can be seen that the invention provides the pilot with a detailed stable picture of the target, in contrast to the single overall glint-prone image otherwise available.

In addition, the 'center of area' of the target can be determined by averaging the azimuth values and the elevation values over the range cells. Smooth tracking of the center of area is thus achieved.

By using the very accurate and instantaneous azimuth and elevation sight line rates and range rates which the above high resolution system provides, perspective correction of the displayed picture can be provided to produce true plan and elevation pictures.

Although the operating principles of the above invention have, for conceptual convenience, been described in terms of matched banks of contiguous filters, PSD's and divider circuits, in an alternative practical system, the output signals from the IF amplifiers 19, 21 and 23 are converted into "In phase" and "Quadrature" digital form and all further processing carried out digitally.

We claim:

1. A high resolution radar system comprising a radar transmitter adapted to transmit a pulsed microwave signal in which each pulse is frequency-modulated, the system also comprising a radar receiver including a local oscillator, means for modulating the local oscillator frequency at the same linear rate as the transmitted pulse, means for mixing target returns from scatter points on a target with the local oscillator signal so that each scatter point produces a single-frequency (I.F.) signal of frequency unique to the range of the particular scatter point, and means for displaying a collective representation of the various intermediate frequencies whereby to provide target structure information.

2. A radar system according to claim 1, comprising means for transmitting a sequence of discrete pulses, each pulse having a duration in excess of the system range resolution.

3. A radar system according to claim 2, comprising means for modulating said local oscillator frequency for periods at least equal to the sum of the transmitted pulse duration and a predetermined target extent.

4. A radar system according to claim 3, including means responsive to reception of the first radar returns from a target to trigger operation of said means for modulating said local oscillator frequency.

5. A radar system according to any of claims 1 and 4, comprising a monopulse target detection system for determining scatter point azimuth and elevation positions off boresight, and means for presenting each scatter point by two of the parameters, range, azimuth angle and elevation angle.

6. A radar system according to claim 5, including means for determining the magnitude of the return signal from each scatter point.

7. A radar system according to claim 6, wherein said means for displaying a representation of the target scatter points comprises a CRT display of the scatter point position in azimuth and elevation and of its magnitude in the intensity of the display.

* * * * *